(12) United States Patent
Wilkinson et al.

(10) Patent No.: US 10,457,501 B2
(45) Date of Patent: Oct. 29, 2019

(54) SYSTEMS AND METHODS FOR CONVERTER BED UNLOADING AND LOADING

(71) Applicant: Cyclone Catalyst Properties, LLC, Aurora, NC (US)

(72) Inventors: Kelly O. Wilkinson, Stonewall, NC (US); Richard Scott Norville, Trent Woods, NC (US)

(73) Assignee: Cyclone Catalyst Properties, LLC, Aurora, NC (US)

( * ) Notice: Subject to any disclaimer, the term of this patent is extended or adjusted under 35 U.S.C. 154(b) by 0 days.

(21) Appl. No.: 15/601,289

(22) Filed: May 22, 2017

(65) Prior Publication Data
US 2017/0267466 A1    Sep. 21, 2017

Related U.S. Application Data

(62) Division of application No. 14/237,288, filed as application No. PCT/US2012/050384 on Aug. 10, 2012, now Pat. No. 9,656,816.
(Continued)

(51) Int. Cl.
*B07B 7/00* (2006.01)
*B65G 53/60* (2006.01)
(Continued)

(52) U.S. Cl.
CPC ............ *B65G 53/60* (2013.01); *B01D 45/12* (2013.01); *B01J 8/003* (2013.01); *B01J 8/004* (2013.01);
(Continued)

(58) Field of Classification Search
CPC .. B04C 5/10; B04C 5/185; B04C 7/00; B04C 9/00; B04C 2009/004; B04C 2009/007;
(Continued)

(56) References Cited

U.S. PATENT DOCUMENTS 2,788,087 A    4/1957 Lenehan
3,630,005 A    12/1971 Reinauer
(Continued)

OTHER PUBLICATIONS

PCT International Search Report and Written Opinion for PCT/US2012/050384 dated Jan. 24, 2013.
(Continued)

*Primary Examiner* — Joseph C Rodriguez
(74) *Attorney, Agent, or Firm* — Ward and Smith, P.A.; Ryan K. Simmons

(57) ABSTRACT

A system and method for loading material from a converter bed, such as that in a converter of an acid plant, is provided. The system, may include a vacuum source; a dust collector connected to the vacuum source by a first vacuum hose; a cyclone operatively connected to the vacuum source through the dust collector, wherein the cyclone may be connected to the dust collector by a second vacuum hose; a drop-out hopper operatively attached to the cyclone by a valve, such as an air actuated valve, wherein the drop-out hopper includes a first feed hose; and one or more material storage containers operatively associated with the cyclone via a second feed hose. The method of loading material into a converter bed may include providing a system for loading the material in the converter bed; setting up the system; and loading the material into the converter bed.

34 Claims, 7 Drawing Sheets

Related U.S. Application Data

(60) Provisional application No. 61/522,903, filed on Aug. 12, 2011.

(51) Int. Cl.

| | | |
|---|---|---|
| *B04C 5/185* | (2006.01) | |
| *B01J 8/00* | (2006.01) | |
| *B04C 5/10* | (2006.01) | |
| *B01D 45/12* | (2006.01) | |
| *B65D 88/26* | (2006.01) | |

(52) U.S. Cl.
CPC ............ *B01J 8/0025* (2013.01); *B04C 5/10* (2013.01); *B04C 5/185* (2013.01); *B07B 7/00* (2013.01); *B65D 88/26* (2013.01); *B01J 2208/00752* (2013.01); *B01J 2208/00761* (2013.01)

(58) Field of Classification Search
CPC .... B07B 7/06; B07B 9/00; B07B 9/02; B07B 11/06; B07B 13/16; B07B 15/00; B01J 8/004; B01J 8/0055
See application file for complete search history.

(56) References Cited

U.S. PATENT DOCUMENTS

| | | | | |
|---|---|---|---|---|
| 3,662,886 | A * | 5/1972 | Kennedy, Jr. | ............ B07B 1/30 |
| | | | | 209/250 |
| 3,736,728 | A | 6/1973 | Kleissler, Jr. | |
| 3,951,630 | A | 4/1976 | Kleissler, Jr. | |
| 4,018,671 | A | 4/1977 | Andon et al. | |
| 4,390,419 | A | 6/1983 | Barthelmess | |
| 4,397,741 | A | 8/1983 | Miller | |
| 4,581,050 | A | 4/1986 | Krantz | |
| 4,737,269 | A | 4/1988 | Bischoff | |
| 4,744,890 | A | 5/1988 | Miller | |
| 4,844,665 | A | 7/1989 | Howell | |
| 4,874,409 | A | 10/1989 | Vitovec | |
| 4,917,712 | A | 4/1990 | Crigler | |
| 5,096,472 | A | 3/1992 | Perry | |
| 5,158,583 | A * | 10/1992 | Bodin | ..................... G21F 9/005 |
| | | | | 299/1.4 |
| 5,160,513 | A | 11/1992 | Koves | |
| 5,322,098 | A | 6/1994 | Christianson | |
| 5,401,407 | A | 3/1995 | Jones | |
| 5,607,587 | A | 3/1997 | Langer | |
| 7,282,074 | B1 | 10/2007 | Witter | |
| RE40,048 | E | 2/2008 | Witter | |
| 7,635,011 | B2 * | 12/2009 | Harris | ..................... B01J 8/004 |
| | | | | 141/285 |
| 7,959,870 | B2 * | 6/2011 | Yanokuchi | ............. B65G 53/24 |
| | | | | 29/284 |
| 7,985,272 | B2 | 7/2011 | Higgins | |
| 8,110,025 | B1 * | 2/2012 | Schwaiger | ............. B01D 45/08 |
| | | | | 55/337 |
| 8,337,580 | B2 | 12/2012 | Manska | |
| 9,527,091 | B2 * | 12/2016 | Corcoran | .......... B01D 21/0012 |
| 9,656,816 | B2 * | 5/2017 | Wilkinson | .............. B04C 5/185 |
| 2003/0131571 | A1 | 7/2003 | Demarco | |
| 2003/0200622 | A1 | 10/2003 | Park | |
| 2004/0231091 | A1 | 11/2004 | Oh | |
| 2005/0214177 | A1 | 9/2005 | Albin | |
| 2006/0162298 | A1 | 7/2006 | Oh | |
| 2007/0267090 | A1 | 11/2007 | Jordan et al. | |
| 2009/0101562 | A1 | 4/2009 | Newton | |
| 2010/0094200 | A1 | 4/2010 | Dean | |
| 2013/0167722 | A1 | 7/2013 | Hassan | |
| 2014/0110310 | A1 | 4/2014 | Valerio | |
| 2015/0007532 | A1 | 1/2015 | Kira | |
| 2015/0224517 | A1 | 8/2015 | Ramalingam | |

OTHER PUBLICATIONS

PCT International Preliminary Report on Patentability for PCT/US2012/050384 dated Feb. 27, 2014.

* cited by examiner

SYSTEMS AND METHODS FOR CONVERTER BED UNLOADING AND LOADING

1 RELATED APPLICATIONS

This application is a divisional of and claims priority to U.S. patent application Ser. No. 14/237,288, entitled "Systems and Methods for Converter Bed Unloading and Loading," filed on Feb. 5, 2014, the application of which is a U.S. National Stage Entry of and claims priority to International Patent Application No. PCT/US2012/050384 entitled "Systems and Methods for Converter Bed Unloading and Loading," filed on Aug. 10, 2012, the application of which claims priority to U.S. Patent Application No. 61/522,903, entitled "Systems, Methods, and Apparatuses for Converter Bed Unloading, Screening, and Loading," filed on Aug. 12, 2011, the entire disclosures of which are incorporated herein by reference.

2 FIELD OF THE INVENTION

The present invention generally relates to systems and methods for unloading and loading of material from catalyst converter beds. In particular, the present invention is directed to vacuum unloading and loading of material from catalyst converter beds, such as those used in acid plants.

3 BACKGROUND OF THE INVENTION

Current systems and methods of unloading and loading material (e.g., catalyst, rock, and/or waste) for use in catalyst converters, such as those used in acid plants (e.g., sulphuric acid plants), have a number of drawbacks that negatively affect cost, efficiencies, environmental risks and safety risks associated with the unloading and loading of catalyst material from the beds of converters in acid plants.

Current systems and methods for unloading and loading catalyst converter beds generate a large amount of waste/material loss, unwanted catalyst and rock dust, and are typically slow and inefficient processes. The large amount of waste, material loss (e.g., catalyst and rock), and catalyst dust generated by current systems, results in a number of cost, environmental, and personnel safety issues. As a result, extra equipment, man-power, and precautions are required to deal with these issues, thus increasing overall cost and reducing efficiency. Further still, the current systems and methods require a large amount of storage space for storing unloaded material until it the material is re-loaded back in the converter beds. The large amount of material loss, in particular catalyst material, lost during the unloading and loading process is also undesirable due to the high cost of catalyst material.

Thus, there is a need for an improved system and method for unloading and loading catalyst converter beds that provides improved dust collection; faster material unloading/loading process, increased efficiency; improved environmental and personnel safety; less equipment and man-power requirements; decreased amount of catalyst material loss; and more efficient means for storage of unloaded converter bed materials, such as catalyst and rock.

4 BRIEF DESCRIPTION OF THE INVENTION

The present invention is directed to a systems and methods for converter bed unloading and loading.

In one embodiment, a system for unloading material from a converter bed is provided. The system may include a vacuum source; a dust collector connected to the vacuum source by a first vacuum hose; a cyclone operatively connected to the vacuum source through the dust collector, wherein the cyclone is connected to the dust collector by a second vacuum hose; a material sorting mechanism operatively connected with the cyclone; one or more material storage containers operatively associated with the material sorting mechanism; and a feed hose connected to the cyclone. The material may include one or more of catalyst material, rock material, and waste material. The catalyst material may be a catalyst material suitable for the production of acid and the rock material may be quartz rock. The converter bed may be a converter bed in an acid plant converter. The vacuum source may include at least one of a vacuum truck and a stationary mounted vacuum pump. The first vacuum hose and second vacuum hose may each be an irrigation hose in the range of about three (3) to six (6) inches in diameter. The feed hose may be a smooth bore hose in the range of about three (3) to six (6) inches in diameter. However, other suitable hose types and sizes are contemplated and the above are only meant as non-limiting examples.

The cyclone may include an outer chamber wall forming a housing; an inner chamber wall, the inner chamber wall defining an inner chamber, wherein the inner chamber further comprises a drop-out region; an inline feed inlet forming a passage into the inner chamber; an outlet forming a passage out of the cyclone; and a material drop-out outlet forming a passage out of the drop-out region of the inner chamber. The cyclone inline feed inlet is preferably not angled. The cyclone outlet preferably forms a passage out of the cyclone to the dust collector. The cyclone inner chamber wall is preferably perforated to allow dust and other small particulates to pass through the perforations and be removed through the outlet via suction generated by the vacuum source. In one embodiment the cyclone does not include an inner chamber wall. The second vacuum hose is preferably connected to the cyclone at the outlet. The material drop-out outlet is preferably operatively connected to the material sorting mechanism to allow passage of material to the material sorting mechanism. The feed hose preferably connects to the cyclone at the inline feed inlet. The end of the feed hose that is not connected to the inline feed inlet is preferably positioned in the converter bed to be unloaded. The drop-out region may include a region of the inner chamber created by centrifugal forces and pressure drop generated in the inner chamber of the cyclone via the vacuum source and cyclone design. The material sorting mechanism may include one or more screens, the one or more screens having pore sizes sufficient to screen out the material based on material type. The one or more screens may include a screen with a pore size sufficient to screen out material of about ¾ inch in diameter, a screen with a pore size sufficient to screen out material in the range of about ⅜ to about ½ inches in diameter, and a screen with a pore size sufficient to screen out material with a diameter less than about ⅜ inches in diameter. The material sorting mechanism is preferably operatively associated with the one or more material storage containers via one or more chutes connecting each of the one or more screens with a corresponding material storage container.

The one or more material storage containers may include a container body; an access port located at a top portion of the container body; one or more vents formed on the container body; a division plate positioned internally in the container body forming a gap between a bottom portion of the container body and the division plate, the division plate having one or more openings sized to allow dust and other small particulates to pass through the one or more openings into the gap; and a clean-out port formed in a region of the container body comprising the gap. The gap may be in the range of about a ¼ of an inch to about a ½ inch in height. The material storage container preferably is substantially one of square or rectangular in shape. The material storage container preferably has a capacity to contain in the range of about 800-1000 liters of material. The access port may be in the form a removable lid. The access port may include a vent. The one or more vents may include a filter. The filter may be a HEPA filter. The material storage container may further include support legs. The material storage container may further include a transport case, the transport case preferably being of a suitable size to accommodate the material storage container therein, the transport case further may include support legs. However, other suitable material storage container shapes and capacity sizes are contemplated and the above are only meant as non-limiting examples.

In another embodiment, a method of unloading a converter bed is provided. The method may include providing a system for unloading the material from the converter bed, the system comprising: a vacuum source; a dust collector connected to the vacuum source by a first vacuum hose; a cyclone operatively connected to the vacuum source through the dust collector, wherein the cyclone is connected to the dust collector by a second vacuum hose; a material sorting mechanism operatively connected with the cyclone; one or more material storage containers operatively associated with the material sorting mechanism; and a feed hose connected to the cyclone. The method may further include setting up the system; removing the material from the converter bed via vacuum; and sorting the removed material. The material may include one or more of catalyst material, rock material, and waste material. Setting up the system may include at least one or more of, setting up and positioning the material sorting mechanism; installing the cyclone to the material sorting mechanism; connecting the feed hose to the cyclone, the first vacuum hose to the vacuum source and dust collector, and the second vacuum hose to the cyclone and dust collector; staging material storage containers and attaching chute hoses from the material sorting mechanism to corresponding material storage containers; connecting all required power and air lines; starting the material sorting mechanism and testing functions; and documenting the converter bed prior to material unloading. Removing the material from the converter bed may include at least one or more of, identifying a height level of a top rock layer in the converter bed; removing the top rock layer via the feed hose; marking each top rock layer material storage container with corresponding converter bed and layer location; after removing the top rock layer, identifying a height level of a catalyst layer in the converter bed; removing the catalyst layer via the feed hose; marking each catalyst layer material storage container with corresponding converter bed and layer location; after removing the catalyst layer, identifying a height level of a bottom rock layer in the converter bed; removing the bottom rock layer via the feed hose; marking each bottom rock layer material storage container with corresponding converter bed and layer location; and repeating the above steps until all desired material has been removed from each converter bed. Sorting the removed material may include at least one or more of conveying material onto one or more screens of the material sorting mechanism from a drop-out outlet of the cyclone, wherein the one or more screens may include pore sizes corresponding to the size of a particular material type to be screened out; sorting the material based on size; and conveying sorted material to corresponding material storage containers via chutes. The method may further include, storing the screened material in corresponding material storage containers. The method may further include, inspecting the unloaded converter bed.

In yet another embodiment, a system for loading material into a converter bed is provided. The system may include a vacuum source; a dust collector connected to the vacuum source by a first vacuum hose; a cyclone operatively connected to the vacuum source through the dust collector, wherein the cyclone is connected to the dust collector by a second vacuum hose; a drop-out hopper operatively attached to the cyclone by a valve, such as an air actuated valve, wherein the drop-out hopper includes a first feed hose; and one or more material storage containers operatively associated with the cyclone via a second feed hose. The valve is preferably capable of providing a flow, or feed, rate in the range of about 10000 to 24000 liters of material per hour. The material may include one or more of catalyst material and rock material. The cyclone may include an outer chamber wall forming a housing; a perforated inner chamber wall, the inner chamber wall defining an inner chamber, wherein the inner chamber further comprises a drop-out region; an inline feed inlet forming a passage into the inner chamber; an outlet forming a passage out of the cyclone; a material drop-out outlet forming a passage out of the drop-out region of the inner chamber; and may include a gate positioned at the drop-out outlet. The material drop-out outlet preferably is operatively connected to the drop-out hopper. The second feed hose preferably connects to the cyclone at the inline feed inlet. The end of the second feed hose not connected to the inline feed inlet preferably is in operative connection with one of the one or more material storage containers. In one embodiment the cyclone does not include an inner chamber wall.

The drop-out hopper may include a housing; an inner region defined by the housing; an inlet positioned at a top portion of the housing operatively associated with the cyclone drop-out outlet by a valve, such as an air actuated valve; and a drop-out hopper outlet positioned at a bottom portion of the housing. The drop-out hopper may further include one or more deflector plates positioned at various angles in at least one of the inner region and drop-out hopper outlet. The deflector plate may be positioned at various angles to an inner wall of the drop-out hopper, preferably in the range of greater than 90° to less than 180° to the inner wall of the drop-out hopper and/or the drop-out hopper outlet. The drop-out hopper may further include a vibrator mechanism associated with the drop-out hopper outlet. The vibrator mechanism may be a vibrator ring attached to the outside of the drop-out hopper outlet. The drop-out hopper may further include one or more airline inlets, e.g., positioned at the drop-out hopper outlet for attaching an airline to convey air into the drop-out hopper outlet and in the direction of the first feed hose. The first feed hose is preferably connected to the drop-out hopper at the drop-out hopper outlet. The first feed hose preferably conveys material from the drop-out hopper to the converter beds.

In still yet another embodiment, a method of loading material into a converter bed is provided. The method may include providing a system for loading the material in the converter bed, the system may include a vacuum source; a dust collector connected to the vacuum source by a first vacuum hose; a cyclone connected to the vacuum source through the dust collector, wherein the cyclone is connected to the dust collector by a second vacuum hose; a drop-out hopper operatively connected with the cyclone, by a valve, such as an air actuated valve, wherein the drop-out hopper includes a first feed hose; and one or more material storage containers operatively associated with the cyclone via a second feed hose connected to the cyclone. The valve is preferably capable of providing a flow, or feed, rate in the range of about 10000 to 24000 liters of material per hour. The method may further include setting up the system; and loading the material into the converter bed. The material may include one or more of catalyst material and rock material. Setting up the system may include at least one or more of, setting up the dust collector; operatively attaching the cyclone to the drop-out hopper using a valve, such as an air actuated valve; connecting the first vacuum hose to the vacuum source and dust collector, the second vacuum hose to the cyclone and the dust collector, the first feed hose to the drop-out hopper, and the second feed hose to the cyclone to one of the one or more material storage containers; positioning the cyclone with attached drop-out hopper to a suitable height for material loading; and installing a manway dust collection hose. Loading the material in the converter bed may include at least one or more of, loading a bottom rock layer into the converter bed to a determined height via the first feed hose; leveling the bottom rock layer; loading a catalyst layer into the converter bed to a determined height via the first feed hose; leveling the catalyst layer; loading a top rock layer into the converter bed to a determined height via the first feed hose; leveling the top rock layer; and repeating the above steps until all desired material has been loaded in each converter bed. The method may further include, inspecting the loaded converter bed.

5 BRIEF DESCRIPTION OF THE DRAWINGS

6 DETAILED DESCRIPTION OF THE INVENTION

The present invention relates to systems and methods for catalyst converter bed unloading and loading. The system and method of the invention may be used for unloading, screening and loading material, such as catalyst (for example vanadium pentoxide or other catalyst material) and rock (for example quartz rock), in acid plant converters, for example, sulphuric acid plants.

Figure 1:
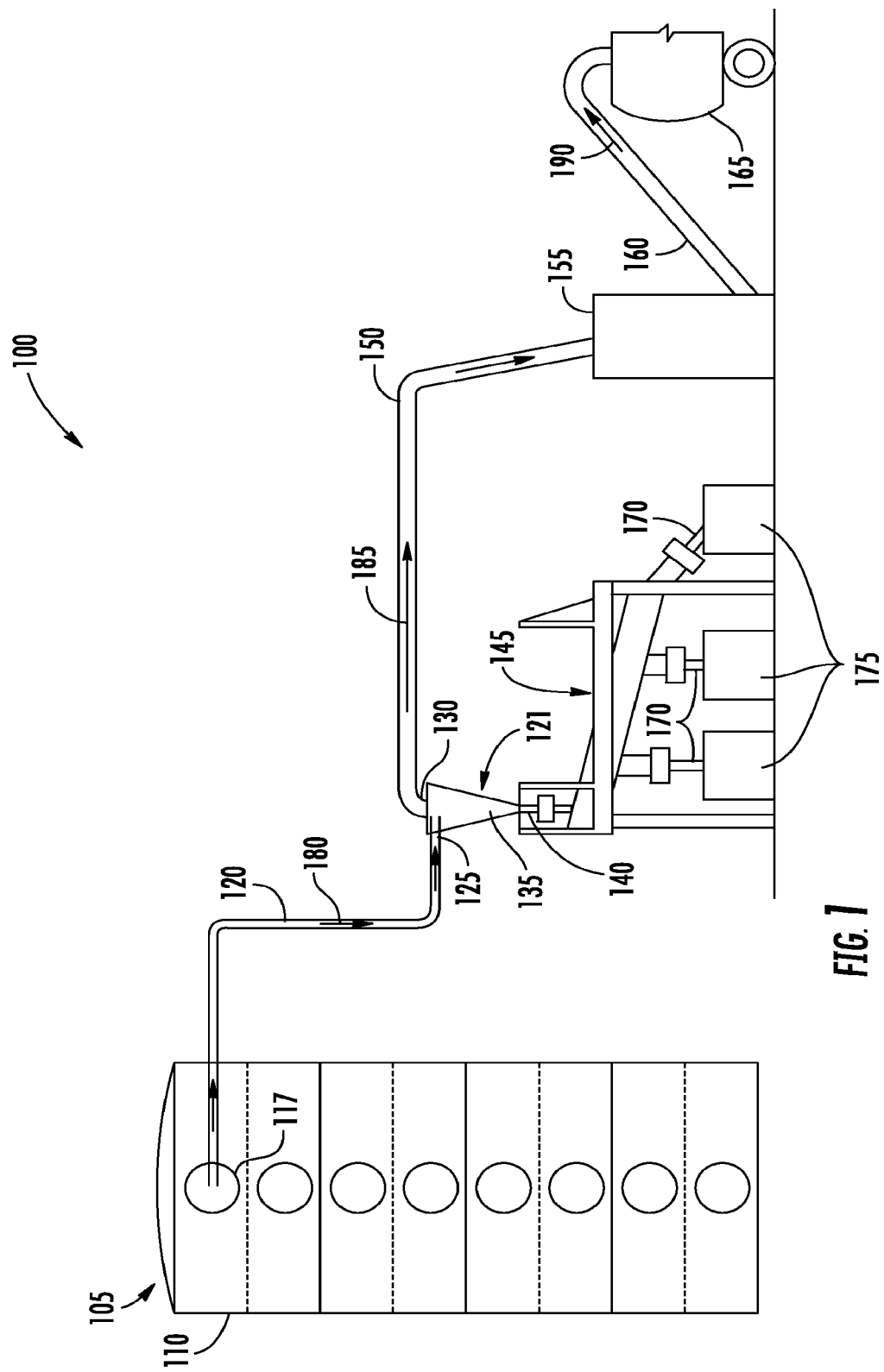
FIG. 1 illustrates a system for unloading material from a converter bed in accordance with an embodiment of the present invention.
Figure 2A:
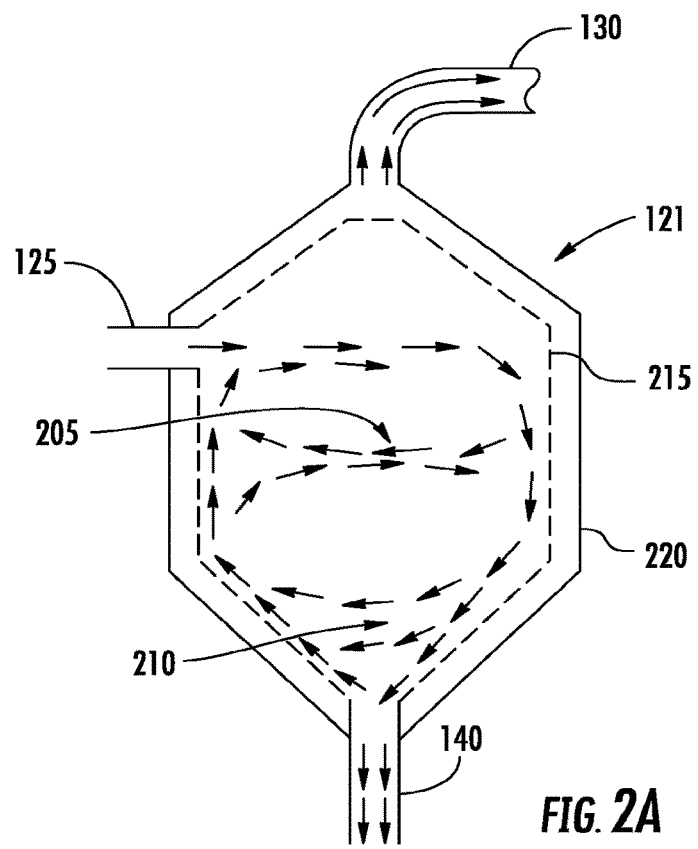
FIG. 2A illustrates a cyclone for unloading/loading material from/into a converter bed in accordance with an embodiment of the present invention.

In one embodiment, a system 100 for vacuum unloading and screening material, such as catalyst, rock, and waste material, from one or more converter beds 110 of a catalyst converter 105. FIGS. 1 and 2A, illustrate an example system 100 and cyclone 121, for unloading material using the cyclone 121 with an inline feed inlet 125. The system 100 may include a vacuum source 165; dust collector 155; a material sorting mechanism 145, cyclone 121; one or more material storage containers 175, feed hose 120, and vacuum hoses 150 and 160.

The vacuum source 165 may, for example, be a conventional vacuum truck and/or stationary mounted vacuum pump, which are well known by those of skill in the art, such as, for example, a vacuum truck similar to those manufactured by GapVax, Inc. The vacuum source 165 creates the negative pressure needed to sustain the system 100.

The dust collector 155, also known as a bag house, may, for example, be a conventional bag house, which is well known by those of skill in the art. The dust collector 155 traps dust particulates, such as catalyst dust, rock dust, and any other dust or fine waste particulates sucked up from the converter beds 110 during the unloading process and contains such dust particulates to keep them from entering the environment and from being pulled into the vacuum source 165. Bag houses are typically used as an air pollution control device that removes particulates out of air released from commercial processes, such acid plants and other industrial companies. A typical bag house may use cylindrical bags (or tubes) made of woven or felted fabric as a filter medium, or in some cases pleated, nonwoven cartridges are used as filtering media instead of bags. The dust-laden air may enter the bag house through hoppers (e.g., funnel-shaped containers used for storing and dispensing particulate) and is directed into the bag house compartment. The air is typically drawn through the bags, or cartridge(s), and the dust particulates are filtered out. A bag house may include bags, fabric and support, a housing or shell, collection hoppers, discharge devices, a filter cleaning device, and a fan.

The material sorting mechanism 145, such as a screening rig, may include screens for screening materials unloaded from the converter beds 110 of catalyst converter 105. For example, the material sorting mechanism 145 may include multiple screens, for example, a screen to screen out waste material, such as broken catalyst particles, broken rock particles, and other waste materials that may be present in the converter beds 110; a screen to screen out catalyst material; and a screen to screen out rock material. In a non-limiting example, the rock material, such as quartz rock, is about ¾ inch in diameter and the catalyst material is about ⅜ to about ½ inches in diameter. The material sorting mechanism 145 may further be attached (e.g., by chutes 170) to the material storage containers 175 in manner that allows for the screened material, e.g., waste, catalyst, and rock to each be collected, as it is screened, into it is corresponding material storage container 175 for storage. Sorting mechanism 145 may be a screener rig of a type manufactured by Rotex Global LLC.

The cyclone 121 is operatively attached to the material sorting mechanism 145, dust collector 155, and vacuum source 165. The cyclone 121 includes an inline feed inlet 125, an outlet 130, an inner chamber 205, an inner chamber wall 215, an outer chamber wall 220, and a drop-out outlet 140. The inner chamber 205 includes a drop-out region 210 which allows material, such as the rock, catalyst, and larger waste to drop out of the cyclone 121 inner chamber 205 through the drop-out outlet 140 and onto the screens of material sorting mechanism 145. The inner chamber wall 215 is preferably perforated, which allows dust and other fine particulates, such as rock and catalyst dust, to pass through the perforations and to be removed and pulled by vacuum suction to the dust collector 155. In one embodiment cyclone 121 does not include inner chamber wall 215, and the inner chamber 205 is defined by the outer chamber wall 220.

The vacuum source 165 is connected, through the dust collector 155, to the outlet 130 of the cyclone 121 by a vacuum hose 150, such as an irrigation hose about three (3) to about six (6) inches in diameter. The feed hose 120, such as a smooth bore hose about three (3) to about six (6) inches in diameter, is connected to the inline feed inlet 125 of the cyclone 121 and is used to remove material, e.g., waste, catalyst, and rock from the converter beds 110. The drop-out outlet 140 is operatively associated with the screens of the material sorting mechanism 145, such as to allow material, e.g., waste, catalyst, and rock, removed from the converter beds 110 to be discharged onto the screens and screened into its corresponding material storage container 175.

In operation, a vacuum is created by the vacuum source 165, and is pulled, in the direction indicated by arrows 180, 185, and 190, through the dust collector 155, the cyclone 121, and the various hoses 120, 150, and 160 to remove the material, e.g., waste, catalyst, and rock, from the converter bed(s) through the feed hose 120 connected to the inline feed inlet 125 of the cyclone 121. An operator uses the feed hose 120 to remove the material in layers as they are present in the converter beds 110, for example, the operator may first remove a top rock layer, then a catalyst layer, and then a bottom rock layer. Removal of the bottom rock layer allows for removal of all the remaining dust contaminants that may be present in the converter bed 110, and for inspection of the screens, saddles, poles, convertor floor, and other components and structures (not shown) of the converter bed 110.

The material, e.g., waste, catalyst, and rock is removed through the feed hose 120 by the negative pressure created by the vacuum source 165, which is attached to the cyclone 121, through the dust collector 155, by vacuum hoses 150 and 160. The removed material enters the cyclone 121 via the feed hose 120 through the inline feed inlet 125 and into the inner chamber 205 of the cyclone 121, while dust particulates and other fine waste particles are evacuated through the perforations of inner chamber wall 215, through the cyclone outlet 130 then to the dust collector 155 and collected into a material storage container 175 for containment and later disposal. Collecting the dust and other fine waste particles in a material storage container 175 at the dust collector 155 eliminates the need for an operator to open the vacuum source 165, e.g., the vacuum truck, and manually transfer the dust waste material into containers, which may cause greater exposure of the contaminant dust to the environment and work personnel.

Once in the inner chamber 205 of the cyclone 121, the material, such as rock, catalyst, and larger waste fall into the drop-out region 210 due to the centrifugal forces and pressure drop generated in the cyclone 121 inner chamber 205 by vacuum source 165. The material in the drop-out region 210 then passes through the drop-out outlet 140 and onto the screens of the material sorting mechanism 145, where the material is screened and sorted based on material type and collected in a corresponding material storage container 175, e.g., all screened out waste material is collected in a waste material storage container, all screened out rock is collected in a rock material storage container, and all screened out catalyst material is collected in a catalyst material storage container. The material sorting mechanism 145 preferably includes screens allowing the material to be sorted by material type based on size, e.g., rock, waste, catalyst. In one example, the rock material, such as quartz rock, is about ¾ inch in diameter; and the catalyst material is about ½ to about ⅜ inches in diameter. The screened material is associated with its corresponding material storage container 175, such as by chute 170, thus, allowing the screened out material to be collected in the correct material storage container 175.

Figure 2B:
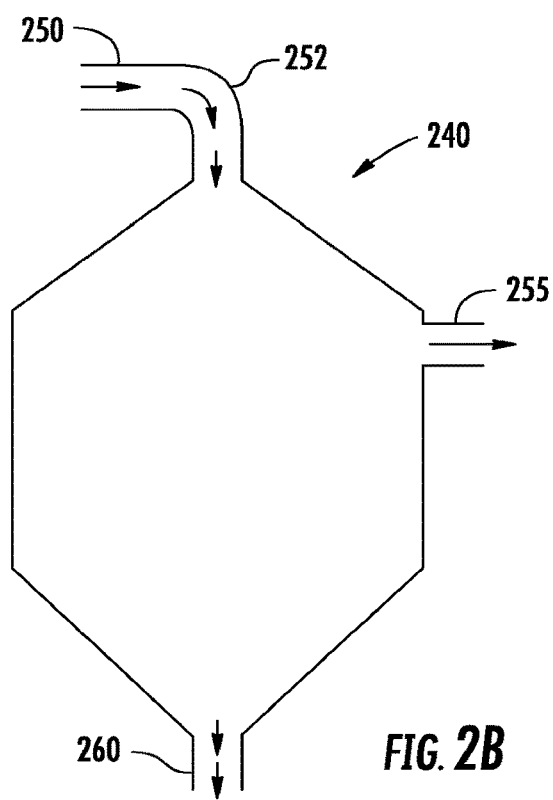
FIG. 2B illustrates a conventional (prior art) cyclone for unloading/loading a converter bed.

One advantage of the present invention is the design and placement of the inline feed inlet 125, which facilitates in the reduction of material loss, such as expensive catalyst material, during material unloading from the converter beds 110. In conventional cyclones, such as that shown as 240 with reference to FIG. 2B, feed inlet 250 is an angled (e.g., 90°) inlet pipe. In such a design, when the material enters the cyclone 240 through the angled inlet 250 it tends to strike a back wall 252 of the angled inlet 250 when entering the cyclone 240, thus causing some of the material (catalyst and rock) to break into smaller pieces. This causes some of the material, the broken up smaller pieces, to be lost by either, or both of, traveling out a cyclone outlet 255 with the air, dust, and other small particles, or it gets screened out as waste material because it is too small to be captured by the larger pore size catalyst or rock screens during screening. This is disadvantageous as the catalyst material is expensive and acid plants want to reduce their material loss as much as possible during the unloading and loading processes. The present invention reduces these material losses by using cyclone 121 with the unique inline feed inlet 125 design and by also the cyclone having an inner chamber wall 215 and outer chamber wall 220, as shown in FIG. 2A. The inline feed inlet 125 design allows the unloaded material, e.g., catalyst and rock, to enter directly into the cyclone 121 inner chamber 205 without having to pass through an angled inlet (such as 250 in FIG. 2B), thus eliminating the issue described above of the material striking the back wall 252 of the angled inlet 250 and potentially breaking up into smaller pieces and being lost as waste material. The inner chamber wall 215 of the present invention is also easily replaceable, so after a period of use if it is damaged due to, for example, the rock material striking it upon entry, it can be replaced without the need to replace the entire cyclone 121. Conventional cyclones, such as 240 in FIG. 2B, used an angled inlet, such as 250 in FIG. 2B, to absorb the impact of incoming rock material thus protecting the inner walls of the cyclone; however, this also resulted in higher losses of catalyst material as explained above. The cyclone 121, having an inner chamber wall 215 that is perforated and outer chamber wall 220 design, further helps maintain the negative pressure needed to sustain the system 100 and remove dust and other fine waste particles to the dust collector 155, while allowing for a dropout region 210 for catalyst and rock material to drop out of the cyclone 121 and onto the screen rig 145, and further eliminates the complicated interlock mechanism used in typical cyclones to allow material to be removed while maintaining the negative pressure needed to sustain such systems.

Figure 3:
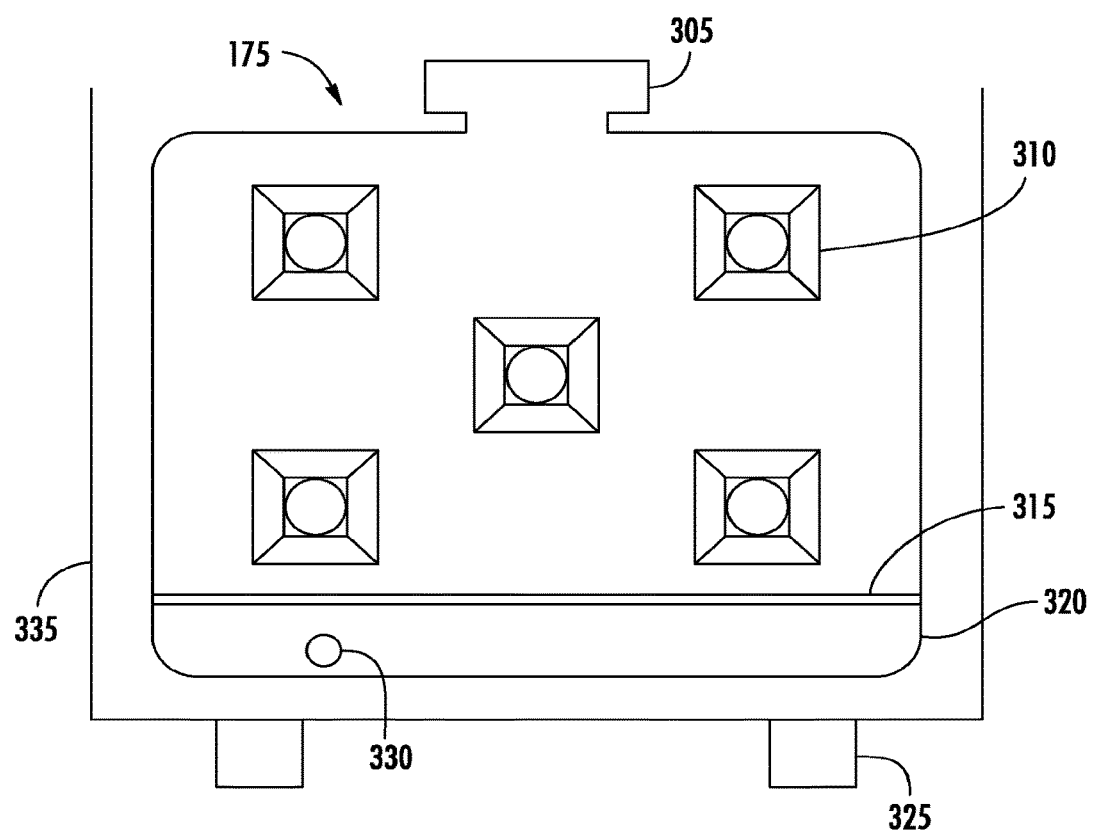
FIG. 3 illustrates a material storage container in accordance with an embodiment of the present invention

FIG. 3, illustrates an example material storage container 175 according to an embodiment of the invention. In one embodiment the material storage container 175 is a substantially square or rectangular container and in one non-limiting example can hold approximately 800-1000 liters of material, such as catalyst, rock, or waste. It should be appreciated that the material storage container may be of other suitable shapes (e.g., barrel, trapezoidal, etc.) and sizes (e.g., able to hold more or less than 800-1000 liter), and the above are just non-limiting examples of the shape and potential capacity of the material storage container 175. The material storage container 175 may include an access port 305, such as a removable lid, for screening and material reloading; one or more vents 310; a division plate 315; and a dust collection region 320. The vents 310 may be any of a variety of vent designs and may include a filter (not shown), such as HEPA filter. The division plate 315 is preferably perforated to allow passage of dust and other fine particulates to the dust collection region 320, and is positioned internally in the material storage container 175 to create a gap between the bottom of the material storage container 175 and the division plate 315 sufficient to allow for dust collection in the dust collection region 320. In one non-limiting example the gap between the bottom of the material storage container 175 and the division plate 315 is in the range of about ¼ of inch to about ½ of an inch. The material storage container 175 may further include a clean out port 330 to allow cleaning out of the dust collection region 320. In one example the material storage container 175 is a substantially square or rectangular container, has a capacity to hold approximately 900-950 liters of catalyst, rock, or waste material and includes: access port 305 (e.g., for screening and reloading material); five 1½ inch diameter vents 310 with HEPA filters; an internal perforated division plate 315 spaced above the bottom of the material storage container 175 sufficient to create a dust collection region 320; a dust collection region 320; and a clean out port 330. The material storage container 175 may further include a transport case 335 for the material storage container 175 to be transported in, for example by a forklift. The transport case 175 may further include support legs 325 of a sufficient height to maintain the material storage container 175 elevated from the ground and to allow enough clearance to allow, for example, forks of a forklift to be accommodated for lifting the transport case 335. The transport case 335 is of sufficient size to allow the material storage container 175 to be securely stored and/or carried in it. In one embodiment the material storage container 175, itself, has support legs, similar to support legs 325, such that the transport case 335 is not necessary to transport the material storage container 175, rather the material storage container 175 can be transported itself using a forklift, for example.

The material storage container 175 of the present invention is advantageous over the current state of the art, which typically uses porous single use bags for storing of material, such as catalyst. Such single use bags result in increased dust due to the bags being made of porous material, increased waste as the bags are not reusable and must be disposed of appropriately, are bulky and difficult to handle, and do not stack efficiently, thus requiring increased storage area. The use of porous single use bags (such as those conventionally used), causes increased environmental, health, cost, waste, man-power, and storage space issues. The material storage containers 175 of the present invention are reusable, have a dust collection area, are non-porous, have filtered ventilation, are durable, and are stackable thus taking much less storage space.

Figure 4:
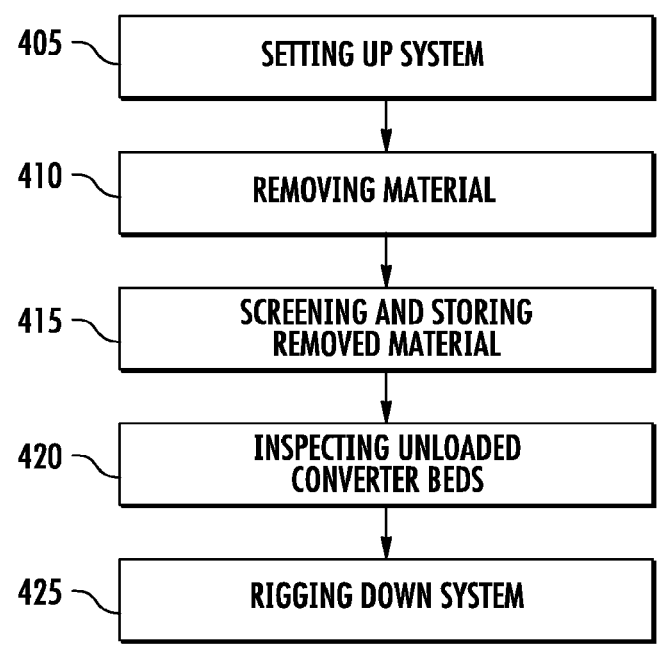
FIG. 4 illustrates a flow diagram for unloading a converter bed in accordance with an embodiment of the present invention.

FIG. 4, illustrates an example method 400 for unloading material, such as catalyst, rock, and waste from a converter bed 110 using the system 100. The method preferably includes:

Step 405, setting up system 100. Step, 405 may include:
a. positioning the material sorting mechanism 145 based on accessibility to the convertor 105 and setting up the material sorting mechanism 145, e.g., attaching all legs to the material sorting mechanism 145 and secure all hardware (bolts, etc.);
b. attaching and hooking up the dust collector 155 for dust collection;
c. installing the cyclone 121 to the material sorting mechanism 145 and securing;
d. attaching all hoses (feed hose 120, vacuum hose 150, and vacuum hose 160), e.g., to cyclone 121, dust collector 155, vacuum source 165;
e. staging all material storage container 175 (e.g., rock, catalyst, waste) and attaching chute hoses 170 from material sorting mechanism 145 screens to corresponding material storage containers 175 (e.g., rock, catalyst, waste);
f. connecting all required power and air lines;
g. starting the material sorting mechanism 145 and test functions; and
h. documenting (e.g., videotaping) each converter bed 110 of the catalyst converter 105 before material unloading/ screening;

Step 410, removing material. Step, 410 may include:
a. identifying and/or recording height level of top rock layer in the converter bed 110 (mark converter bed 110 at top of top rock layer, e.g., with spray paint);
b. removing top rock layer with feed hose 120;
c. marking each rock material storage container 175 to ensure rock material is reinstalled to the same converter bed 110 and layer;
d. after top rock layer removal, identifying and/or recording height level of catalyst in the converter bed 110 (mark converter bed 110 at top of catalyst level, e.g., with spray paint);
e. removing all catalyst with feed hose 120;
f. marking each catalyst material storage container 175 for locations, so that catalyst are returned to the same converter bed 110 removed from;
g. after catalyst layer removal, identifying and/or recording height level of bottom rock layer in the converter bed 110 (mark converter bed 110 at top of bottom rock level, e.g., with spray paint);
h. removing bottom rock layer with feed hose 120;
i. marking each rock material storage container 175 to ensure rock material is reinstalled to the same converter bed 110 and layer; and
j. repeating steps (a)-(i) until all material has been removed from each converter bed 110.

Step 415, screening and storing removed material. In step 415, material unloaded from the converter beds 110 of the catalyst converter 105 are conveyed onto the screens of the material sorting mechanism 145 through drop-out outlet 140 of cyclone 121. The material sorting mechanism 145 preferably includes a number of screens, e.g., screen to screen out waste material, such as broken catalyst particles, broken rock particles, and other waste materials that may be present in the converter beds 110; a screen to screen out catalyst material; and a screen to screen out rock material. The screened material is then directed to corresponding material storage containers 175 attached to the material sorting mechanism 145 (e.g., by chute hoses 170) in a manner that allows for the screened material, e.g., waste, catalyst, and rock to each be collected, as it is screened out, into it is corresponding material storage container 175 for storage.

The material storage containers 175 are then stored in a storage area, until ready to be reloaded into the converter beds 110.

Step 420, inspecting of unloaded converter beds 110. In step 420, the unloaded converter beds 110 are inspected for damage. For example, the screens, poles, grate, side walls, etc., of the convertor 105 are inspected and the inspection documented (e.g., video inspection).

Step 425, rigging down system 100. In step 425, all the equipment of system 100 is either rigged down, or if the unloaded material is to be reloaded after clean out of the catalyst converter 105, then the system 100 is converted to system 500 for loading the material back into the converter beds 110.

The above steps are a non-limiting example only, and the steps may be carried out in various order and are not limited to the order as presented above, further all steps may not be required, some may be optional or not required.

Figure 5:
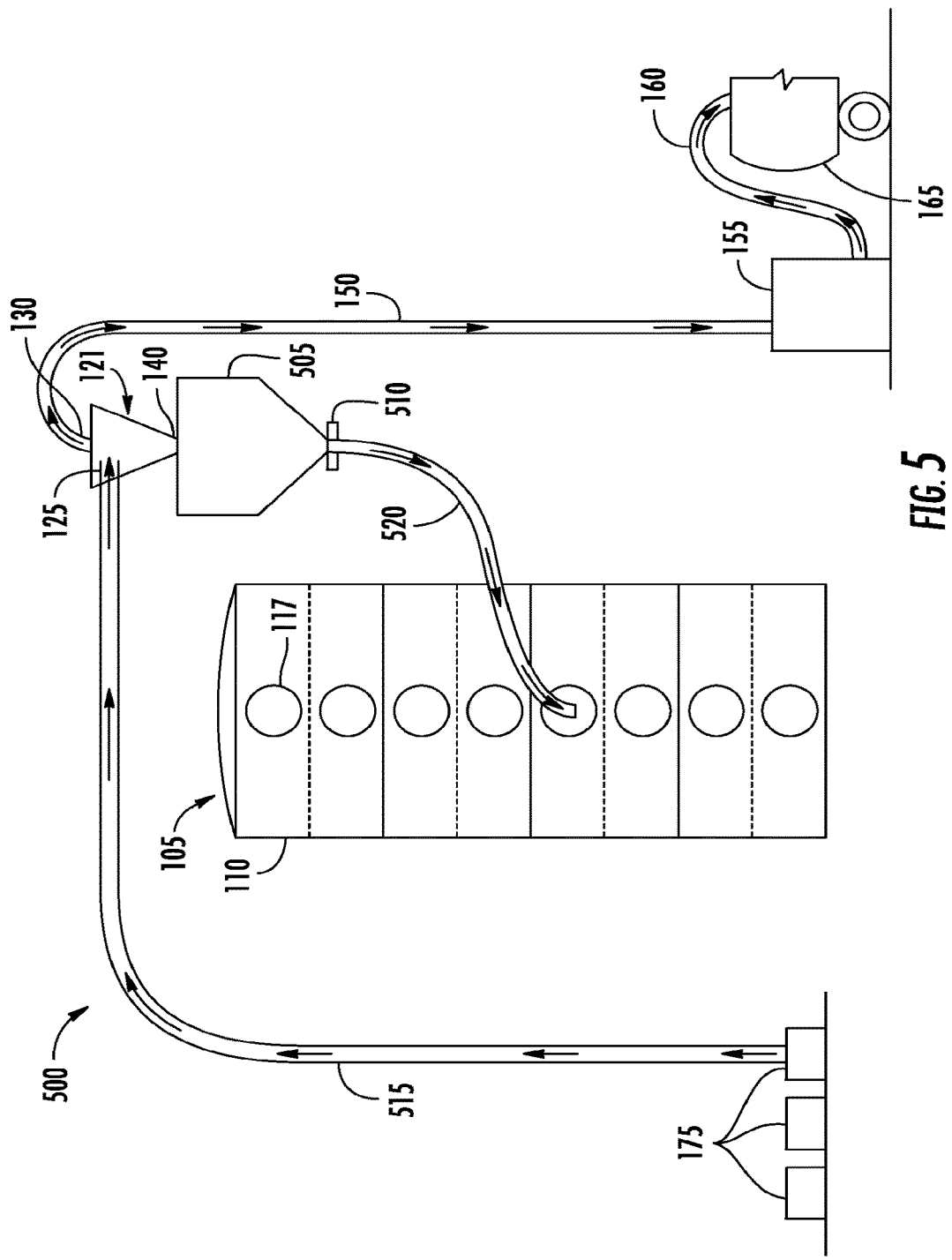
FIG. 5 illustrates a system for loading material into a converter bed in accordance with an embodiment of the present invention.
Figure 6:
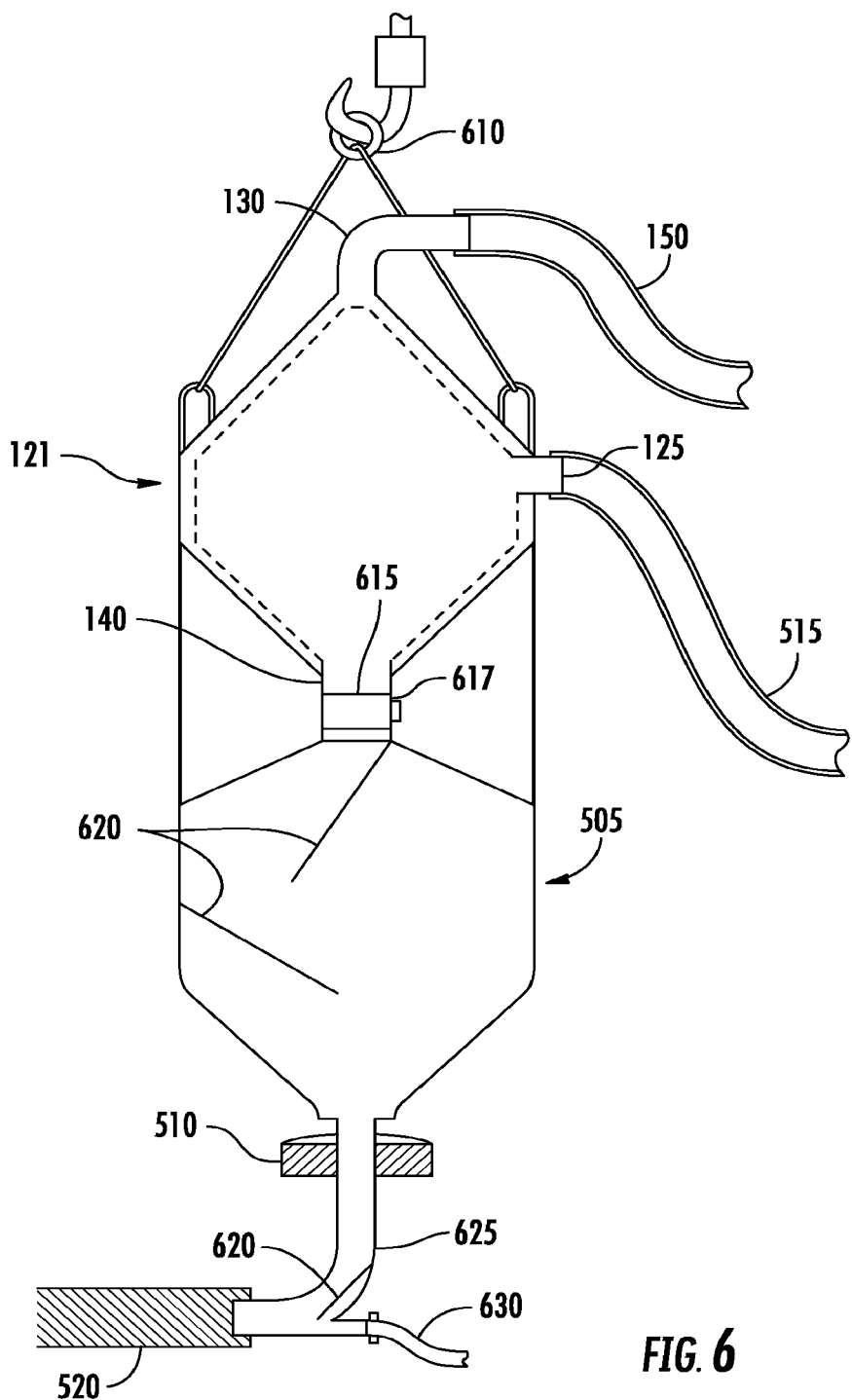
FIG. 6 illustrates the cyclone of FIG. 2A with an attached drop-out hopper for loading a converter bed in accordance with an embodiment of the present invention.

In yet another embodiment, a system 500 for loading material, such as catalyst and/or rock, into the converter beds 110 of the catalyst converter 105 is provided. FIGS. 5 and 6, illustrate an example system 500 and cyclone 121, for loading material, such as catalyst and/or rock into the converter beds 110 of the catalyst converter 105. The system 500 may include vacuum source 165, such as a vacuum truck and/or a stationary mounted vacuum pump; dust collector (bag house) 155; cyclone 121; valve 617; a drop-out hopper 505; material storage containers (totes) 175; a lift mechanism, such as a crane (not shown) for positioning the cyclone 121 with associated chop-out hopper 505 to facilitate loading; feed hoses 515 and 520; and vacuum hoses 150 and 160.

The vacuum source 165 is connected to the dust collector 155 by vacuum hose 160, such as an irrigation hose about three (3) to about six (6) inches in diameter. The dust collector 155 is further connected to the outlet 130 of the cyclone 121 by vacuum hose 150, such as an irrigation hose about three (3) to about six (6) inches in diameter. The cyclone 121, similar to that as shown in FIG. 2, and further with regards to FIG. 6, is in operative association with the drop-out hopper 505 by valve 617, such as an air actuated valve, such that it allows conveyed material, such as rock and catalyst, to fall out of the drop-out region 210 of cyclone 121 through the drop-out outlet 140 and into the drop-out hopper 505 via valve 617. The valve 617 is preferably capable of providing a flow, or feed rate in the range of about 10000 to 24000 liters of material per hour. Drop-out hopper 505 may be secured to cyclone 121 by cables, chains, brackets, or other mechanism or hardware suitable for securing drop-out hopper 505 to cyclone 121. Cyclone 121, is further operatively associated with one or more of the material storage containers 175 by feed hose 515, such as a smooth bore hose about three (3) to about six (6) inches in diameter. Feed hose 515 is operatively associated with one or more of the material storage containers 175, such that the material (rock and/or catalyst) is conveyed, by vacuum suction, from the material storage containers 175 through the feed hose 515 and to the cyclone 121. The drop-out hopper 505 includes feed hose 520, such as a smooth bore hose about three (3) to about six (6) inches in diameter, connected to drop-out hopper outlet 625 of the drop-out hopper 505. Feed hose 520 is of sufficient length and size to facilitate loading of material, such as rock and/or catalyst, from the drop-out hopper 505 into the converter beds 110 of the catalyst converter 105, and may be adjustable to be longer or shorter as may be need for a particular plant site.

The cyclone 121 may further include a gate dump 615 (or other suitable gating mechanism) at the drop-out outlet 140, which, with valve 617, facilitates material passing from the drop-out outlet 140 through to the drop-out hopper 505. The cyclone 121 may also include a lift attachment mechanism 610, such as a cable or hook point, where a lift mechanism, such as a crane, may attach to the cyclone 121, with attached drop-out hopper 505, to be elevated to the proper height position for loading material into the converter beds 110 of the catalyst converter 105.

The drop-out hopper 505 may further include one or more deflector plates 620 positioned in the inner region of the drop-out hopper 505 and/or drop-out hopper outlet 625. The deflector plates 620 help facilitate conveying material from the drop-out outlet 140 through the drop-out hopper 505 and through the drop-out hopper outlet 625. Deflector plates 620 also help to reduce damage to the drop-out hopper 505 and to the material by deflecting direct impact of the material with, for example, the bottom of the drop-out hopper 505 and drop-out hopper outlet 625. The deflector plates 620 may be positioned at various angles to an inner wall of the drop-out hopper 505, preferably in the range of greater than 90° to less than 180° to the inner wall of the drop-out hopper 505 and/or the drop-out hopper outlet 625. The drop-out hopper 505 may further include a vibrator device 510 (such as a vibrator ring), operatively connected to the drop-out hopper outlet 625 to impart vibratory force thereto to facilitate conveying material through the drop-out hopper outlet 625 and into the attached feed hose 520 for the material to be conveyed to the converter beds 110 of the catalyst convertor 105. The drop-out hopper 505 may further include one or more airline inlets 630. The airline inlet 630, in one example, is positioned at the drop-out hopper outlet 625, for example to convey an air stream in the direction of the feed hose 520. The air inlet 630 allows connection of an airline (not shown), for example about a ¾ inch airline, to the drop-out hopper outlet 625 to help convey material into and along the feed hose 520 to the converter beds 110 of the catalyst convertor 105 being loaded.

In operation, a vacuum is created by the vacuum source 165, and is pulled through the dust collector 155, cyclone 121, and various hoses (feed hose 515, vacuum hose 150, and vacuum hose 160), to convey the material, such as rock or catalyst, from the material storage containers 175, via feed hose 515, to the cyclone 121, which is preferably elevated off the ground by a lifting mechanism, such as a crane. The material enters the cyclone 121 through the inline feed inlet 125 where centrifugal force and pressure drop, generated by the vacuum and cyclone 121 design, allow the material, such as rock or catalyst, to drop into the drop-out region 210 and then into the drop-out outlet 140. Dust and other fine waste particles are evacuated through the perforations of the inner chamber wall 215, through the outlet 130 of the cyclone 121, then to the dust collector 155 and collected in one or more material storage containers 175 for containment and later disposal. When a sufficient amount of material is present in the drop-out outlet 140 the valve 617 opens, and if present a gate dump 615 opens, and the material drops into the drop-out hopper 505. The valve 617 is preferably capable of providing a flow, or feed rate in the range of about 10000 to 24000 liters of material per hour. The material in the drop-out hopper 505 is conveyed down through the drop-out hopper outlet 625, in one example, by gravity feed and into the feed hose 520. The material may be guided down the drop-out hopper 505 by deflector plates 620. The material may also be assisted through the drop-out hopper outlet 625 and into the feed hose 520 by vibrator device 510, where the vibrator device 510 provides a vibratory action at the drop-out hopper outlet 625, thus facilitating movement of the material down the drop-out hopper outlet 625 and into feed hose 520. The material may be further assisted into and along the feed hose 520 by an air stream from an airline connected to air inlet 630. Feed hose 520 is preferably connected to the drop-out hopper outlet 625 at one end, with the other end positioned in the converter bed 110 being loaded. This process is repeated as necessary to load all the rock and/or catalyst in the converter beds 110 as may be required in a particular catalyst converter 105.

Figure 7:
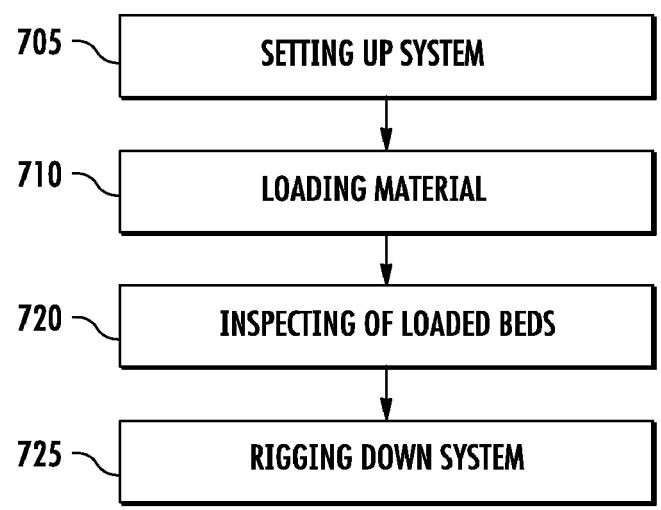
FIG. 7 illustrates a flow diagram for loading a converter bed in accordance with an embodiment of the present invention.

FIG. 7, illustrates an example method 700 for loading material, such as catalyst and rock into a converter bed 110 using the system 500. The method may include:

Step 705, setting up system 500. Step, 705 may include:
a. attaching all hoses (vacuum hose 160, vacuum hose 150, feed hose 515, and feed hose 520) to the vacuum source 165, dust collector 155, cyclone 121, material storage container 175, and drop out hopper 505;
b. positioning the cyclone 121 with attached valve 617 and drop out hopper 505, for example, lifting to an appropriate height using a crane;
c. setting up the dust collector 155; and
d. installing and attaching a man-way dust collection hose (not shown) to the dust collector 155, or to a secondary dust collector (not shown) and vacuum source. The man-way dust collection hose may be installed in each converter bed man-way (not shown), and is preferably installed in the man-way that is opposite of the man-way loading/entry door 117 (shown in FIGS. 1 and 5), however, if there is only one man-way both the feed hose 520 and dust collection hose may be run through the one man-way.

Step 710, loading material. Step, 710 may include:
a. loading bottom rock layer into the converter beds 110 to the proper height (e.g., height mark indicated at step 410 of method 400), and leveling rock, e.g., using a rake, to make an even bottom rock layer;
b. loading catalyst layer into the converter beds 110 in the correct location (the same location from which it was removed in step 410 of method 400), and to the proper height (e.g., height mark indicated at step 410 of method 400), and leveling catalyst layer, e.g., using a rake, to make an even catalyst layer;
c. loading top rock layer into the converter beds 110 to the proper height (e.g., height mark indicated at step 410 of method 400), and leveling rock, e.g., using a rake, to make an even top rock layer;
d. repeating steps (a)-(c) until all rock and catalyst has been loaded into the converter beds 110 as required;

Step 720, inspecting of loaded converter beds 110. In step 720, the converter beds 110 are inspected after the loading is complete (e.g., video inspection).

Step 725, rigging down system 700. In step 725, all the equipment of system 700 is rigged down.

The above steps are a non-limiting example only and the steps may be carried out in various order and are not limited to the order as presented above, further all steps may not be required, some may be optional or not required.

7 CONCLUDING REMARKS

The foregoing detailed description of embodiments refers to the accompanying drawings, which illustrate specific embodiments of the invention. Other embodiments having different structures and operations do not depart from the scope of the present invention. The term "the invention" or the like is used with reference to certain specific examples of the many alternative aspects or embodiments of the applicant's invention set forth in this specification, and neither its use nor its absence is intended to limit the scope of the applicant's invention or the scope of the claims. This specification is divided into sections for the convenience of the reader only. Headings should not be construed as limiting of the scope of the invention. The definitions are intended as a part of the description of the invention. It will be understood that various details of the present invention may be changed without departing from the scope of the present invention. Furthermore, the foregoing description is for the purpose of illustration only, and not for the purpose of limitation.

We claim:

1. A system for unloading material from a converter bed, the system comprising:
(a) a vacuum source;
(b) a dust collector connected to the vacuum source by a first vacuum hose;
(c) a cyclone, the cyclone comprising:
(i) an outer chamber wall forming a housing;
(ii) an inner chamber wall, the inner chamber wall defining an inner chamber, wherein the inner chamber further comprises a drop-out region;
(iii) an inline feed inlet forming a passage into the inner chamber, wherein a terminal end of the inline feed inlet pipe does not extend substantially past the inner chamber wall, wherein a portion of the inline feed inlet pipe that forms the passage extending from outside an exterior of the outer chamber wall to the inner chamber is not angled and comprises a substantially uniform diameter, and wherein the inline feed inlet pipe forms the passage to the inner chamber through a vertical side portion of the cyclone and is substantially perpendicular relative thereto;
(iv) an outlet forming a passage out of a top portion of the cyclone;
(v) a material drop-out outlet forming a passage out of the drop-out region of the inner chamber, wherein the material drop-out outlet is disposed at a bottom portion of the cyclone; and
wherein the cyclone is operatively connected to the vacuum source through the dust collector, and wherein the cyclone is connected to the dust collector by a second vacuum hose; and
(d) a feed hose connected to the cyclone.

2. The system of claim 1 wherein the material comprises one or more of catalyst material, rock material, and waste material.

3. The system of claim 2 wherein the catalyst material comprises a catalyst material suitable for the production of acid and the rock material comprises quartz rock.

4. The system of claim 1 wherein the converter bed comprises a converter bed in an acid plant converter.

5. The system of claim 1 wherein the vacuum source comprises at least one of a vacuum truck and a stationary mounted vacuum pump.

6. The system of claim 1 wherein the first vacuum hose and second vacuum hose each comprise an irrigation hose in the range of about three (3) to six (6) inches in diameter.

7. The system of claim 1 wherein the feed hose comprises a smooth bore hose in the range of about three (3) to six (6) inches in diameter.

8. The system of claim 1 wherein the outlet forms a passage out of the cyclone to the dust collector.

9. The system of claim 1 wherein the inner chamber wall has perforations sized to allow dust and other small particulates to pass through the perforations and be removed through the outlet via suction generated by the vacuum source.

10. The system of claim 1 wherein the second vacuum hose is connected to the cyclone at the outlet.

11. The system of claim 1 wherein the material drop-out outlet is operatively connected to a material sorting mechanism to allow passage of material to the material sorting mechanism.

12. The system of claim 1 wherein the feed hose connects to the cyclone at the inline feed inlet.

13. The system of claim 12 wherein the end of the feed hose that is not connected to the inline feed inlet is positioned in the converter bed to be unloaded.

14. The system of claim 1 wherein the drop-out region comprises a region of the inner chamber created by centrifugal forces and pressure drop generated in the inner chamber of the cyclone via the vacuum source and cyclone design.

15. The system of claim 11 wherein the material sorting mechanism comprises one or more screens, the one or more screens having pore sizes sufficient to screen out the material based on material type.

16. The system of claim 15 wherein the one or more screens comprise a screen with a pore size sufficient to screen out material of about ¾ inch in diameter, a screen with a pore size sufficient to screen out material in the range of about ⅜ to about ½ inches in diameter, and a screen with a pore size sufficient to screen out material with a diameter less than about ⅜ inches in diameter.

17. The system of claim 15 wherein the material sorting mechanism is operatively associated with one or more material storage containers via one or more chutes connecting each of the one or more screens with a corresponding material storage container.

18. The system of claim 17 wherein the one or more material storage containers, comprises:
   (a) a container body;
   (b) an access port located at a top portion of the container body;
   (c) one or more vents formed on the container body;
   (d) a division plate positioned internally in the container body forming a gap between a bottom portion of the container body and the division plate, the division plate having one or more openings sized to allow dust and other small particulates to pass through the one or more openings into the gap; and
   (e) a clean-out port formed in a region of the container body comprising the gap.

19. The system of claim 18 wherein the material storage container is substantially one of square or rectangular in shape.

20. The system of claim 18 wherein the material storage container has a capacity to contain in the range of about 800-1000 liters of material.

21. The system of claim 18 wherein the access port comprises a removable lid.

22. The system of claim 18 wherein the access port includes a vent.

23. The system of claim 18 wherein the one or more vents include a filter.

24. The system of claim 18 wherein the filter comprises a HEPA filter.

25. The system of claim 18 wherein the material storage container further comprises a transport case, the transport case being of a suitable size to accommodate the material storage container therein, the transport case further comprising support legs.

26. The system of claim 18 wherein the gap is in the range of about ¼ of inch to about ½ of an inch in height.

27. A method of unloading material from a converter bed, the method comprising:
   (a) providing a system for unloading the material from the converter bed, the system comprising:
      (i) a vacuum source;
      (ii) a dust collector connected to the vacuum source by a first vacuum hose;
      (iii) a cyclone, the cyclone comprising:
         a chamber wall forming a housing, the housing defining an inner chamber, wherein the inner chamber further comprises a drop-out region;
         an inline feed inlet forming a passage into the inner chamber, wherein a terminal end of the inline feed inlet pipe does not extend substantially past an inner surface of the housing into the inner chamber, wherein a portion of the inline feed inlet pipe that forms the passage extending from outside an exterior of the chamber wall to the inner chamber is not angled and comprises a substantially uniform diameter, and wherein the inline feed inlet pipe forms the passage to the inner chamber through a vertical side portion of the cyclone and is substantially perpendicular relative thereto;
         an outlet forming a passage out of a top portion of the cyclone;
         a material drop-out outlet forming a passage out of the drop-out region of the inner chamber, wherein the material drop-out outlet is disposed at a bottom portion of the cyclone;
         a gate positioned at the drop-out outlet; and
         wherein the cyclone is operatively connected to the vacuum source through the dust collector, and wherein the cyclone is connected to the dust collector by a second vacuum hose; and
      (iv) a feed hose connected to the cyclone;
   (b) setting up the system;
   (c) removing the material from the converter bed via vacuum; and
   (d) sorting the removed material.

28. The method of claim 27 wherein the material comprises one or more of catalyst material, rock material, and waste material.

29. The method of claim 27 wherein setting up the system comprises at least one or more of, setting up and positioning a material sorting mechanism; installing the cyclone to the material sorting mechanism; connecting the feed hose to the cyclone, the first vacuum hose to the vacuum source and dust collector, and the second vacuum hose to the cyclone and dust collector; staging one or more material storage containers and attaching chute hoses from the material sorting mechanism to corresponding material storage containers; connecting all required power and air lines; starting the material sorting mechanism and testing functions; and documenting the converter bed prior to material unloading.

30. The method of claim 27 wherein removing the material from the converter bed comprises at least one or more of, identifying a height level of a top rock layer in the converter bed; removing the top rock layer via the feed hose; marking each of a top rock layer material storage container with corresponding converter bed and layer location; after removing the top rock layer, identifying a height level of a catalyst layer in the converter bed; removing the catalyst layer via the feed hose; marking each of a catalyst layer material storage container with corresponding converter bed and layer location; after removing the catalyst layer, identifying a height level of a bottom rock layer in the converter bed; removing the bottom rock layer via the feed hose; marking each of a bottom rock layer material storage container with corresponding converter bed and layer location; and repeating the above steps until all desired material has been removed from each converter bed.

31. The method of claim 27 wherein sorting the removed material comprises at least one or more of conveying material onto one or more screens of a material sorting mechanism from a drop-out outlet of the cyclone, wherein the one or more screens comprise pore sizes corresponding to the size of a particular material type to be screened out; sorting the material based on size; and conveying sorted material to corresponding one or more material storage containers via chutes.

32. The method of claim 27 further comprising, storing the screened material in corresponding one or more material storage containers.

33. The method of claim 27 further comprising, inspecting the unloaded converter bed.

34. A system for unloading material from a converter bed, the system comprising:
   (a) a vacuum source;
   (b) a dust collector connected to the vacuum source by a first vacuum hose;
   (c) a cyclone, the cyclone comprising:
      (i) a chamber wall forming a housing, the housing defining an inner chamber, wherein the inner chamber further comprises a drop-out region;
      (ii) an inline feed inlet forming a passage into the inner chamber, wherein a terminal end of the inline feed inlet pipe does not extend substantially past an inner surface of the housing into the inner chamber, wherein a portion of the inline feed inlet pipe that forms the passage extending from outside an exterior of the chamber wall to the inner chamber is not angled and comprises a substantially uniform diameter, and wherein the inline feed inlet pipe forms the passage to the inner chamber through a vertical side portion of the cyclone and is substantially perpendicular relative thereto;
      (iii) an outlet forming a passage out of a top portion of the cyclone;
      (iv) a material drop-out outlet forming a passage out of the drop-out region of the inner chamber, wherein the material drop-out outlet is disposed at a bottom portion of the cyclone; and
   wherein the cyclone is operatively connected to the vacuum source through the dust collector, and wherein the cyclone is connected to the dust collector by a second vacuum hose; and
   (d) a feed hose connected to the cyclone.

* * * * *